March 12, 1946.  I. L. WILCOX  2,396,358
ARTICLE FORMED OF LAMINATED SHEET MATERIAL
Filed May 20, 1942  2 Sheets-Sheet 1
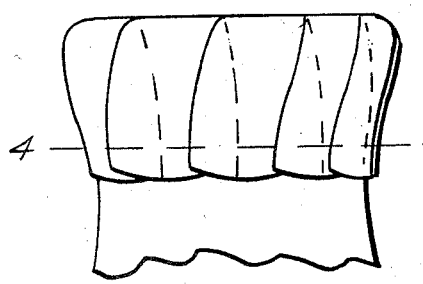
Fig-1-
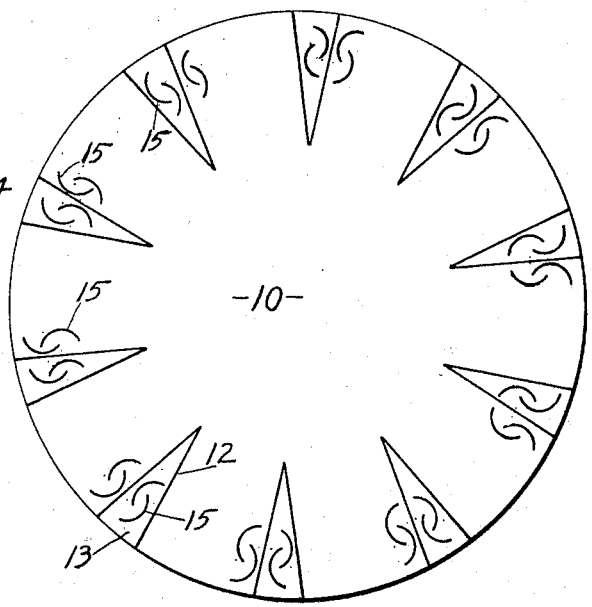
Fig-2-
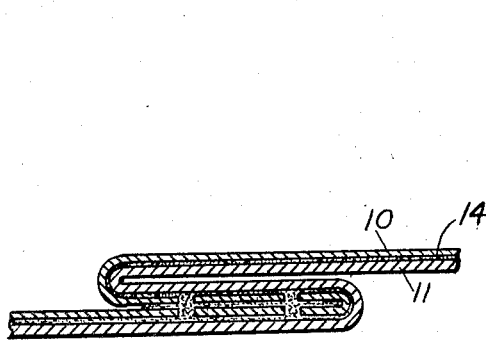
Fig-4-
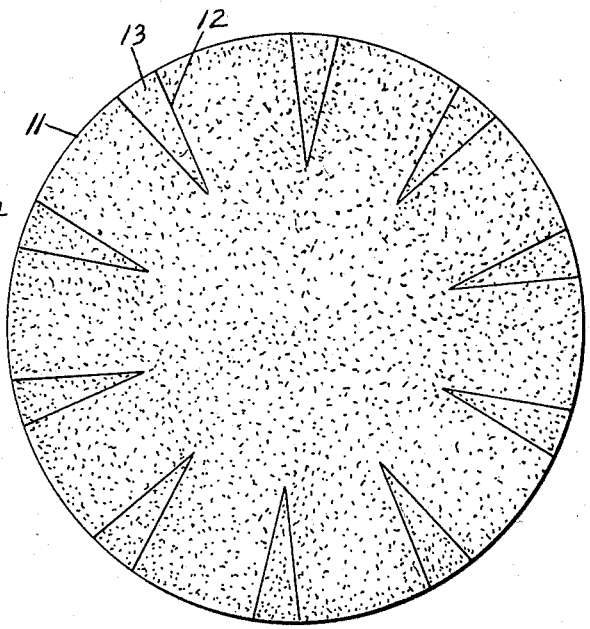
Fig-3-
INVENTOR.
Isaac L. Wilcox
BY Bodell & Thompson
ATTORNEYS.

March 12, 1946.     I. L. WILCOX     2,396,358
ARTICLE FORMED OF LAMINATED SHEET MATERIAL
Filed May 20, 1942     2 Sheets—Sheet 2
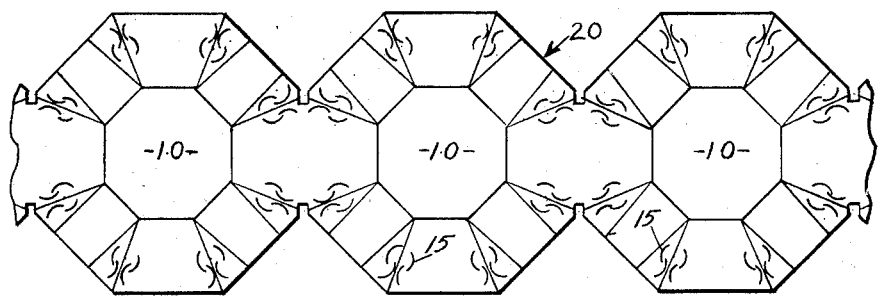
Fig-5-
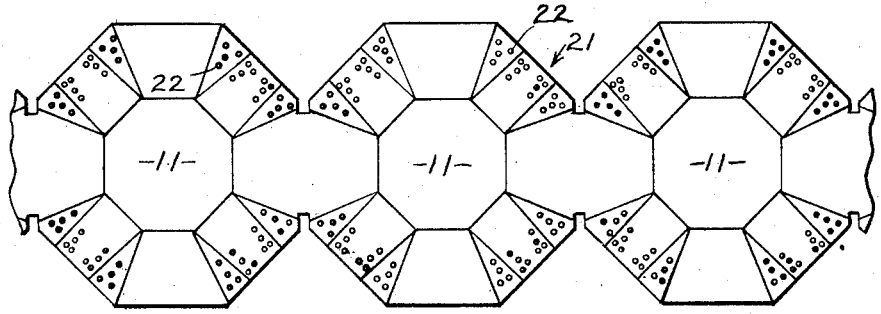
Fig-6-
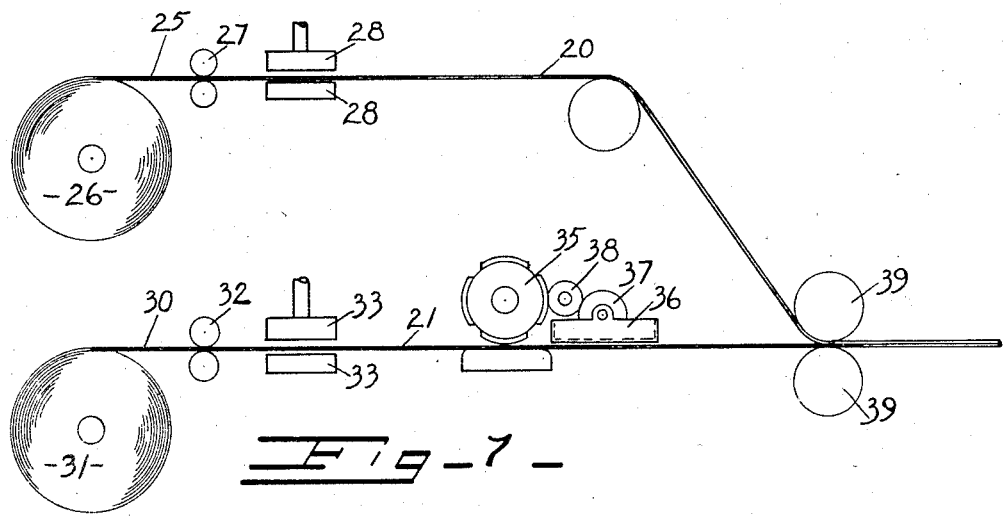
Fig-7-
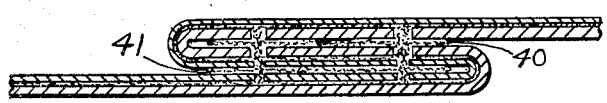
Fig-8-
INVENTOR.
Isaac L. Wilcox
BY Bodell & Thompson,
ATTORNEYS.

Patented Mar. 12, 1946

2,396,358

UNITED STATES PATENT OFFICE 2,396,358

ARTICLE FORMED OF LAMINATED SHEET MATERIAL

Isaac L. Wilcox, Fulton, N. Y., assignor to Oswego Falls Corporation, Fulton, N. Y., a corporation of New York Application May 20, 1942, Serial No. 443,749

5 Claims. (Cl. 215—38)

This invention relates in general to an article formed of sheet material having portions of the material arranged in overlapping relation, with such overlapping portions secured together by means of an adhesive. For example, the article may be a container or box formed of sheet material, such as paperboard, or it may be a hood type bottle cap formed of such material. The container or box being formed from a blank of the material with overlapping portions secured together in the conventional and well understood manner. The bottle cap being likewise formed from a blank of the material with the skirt of the cap contracted about the neck of the bottle with the resultant pleat formations overlapping as is conventional practise.

In the case of the box or container, in most instances, the adhesive is applied moist just before the overlapping parts are juxtapositioned. In some instances, as is also the case with the hood bottle cap, the overlapping portions are coated with a thermoplastic adhesive which is reactivated, or rendered tacky, just prior to the parts being folded in overlapping relation.

These methods of securing the overlapping portions together have certain well understood disadvantages. For example, the thermoplastic adhesive must be reactivated by relatively high heat just prior to the arrangement of the parts in overlapping relation, thereby necessitating the incorporation of some means in the fabricating machines to properly heat or condition the material, and the required heating period and subsequent cooling period are the dominant factors in controlling the speed of the container forming machine or cap applying machine. Also, due to the application of relatively high heat, the blanks are subject to distortion or over-conditioning in the event the machines have to be stopped during the process.

It has heretofore been proposed to secure such overlapping portions by means of a permanently tacky or dry-set adhesive thus avoiding the problem of both moistening the adhesive or applying relatively high heat thereto. However, the use of such adhesives has not been practical due to the fact that the blanks or articles more or less stick together when shipped and particularly when handled in stack formation on the fabricating machines.

This invention therefore is directed more particularly to an article of the type referred to embodying a structure by means of which the permanently tacky or dry-set adhesives, which function properly at ordinary room temperatures or with the application of relatively low heat, are controlled to prevent the adhesives from sticking the blanks or articles together during shipment and handling, and which prevents the adhesives from coming in contact with parts of the fabricating or applying machines, whereby such parts do not become fouled during the folding or contracting operations.

I have illustrated herein an embodiment of my invention in a hood type bottle cap such as is commonly employed to cover the top of a milk bottle. However, it will be apparent from the following description of the invention that it is obviously applicable to any articles formed of sheet material and which have overlapping portions secured together by means of an adhesive.

The invention consists in the novel features and in the combinations and constructions hereinafter set forth and claimed.

In describing this invention, reference is had to the accompanying drawings in which like characters designate corresponding parts in all the views.

Figure 1 is a side elevational view of a cap embodying my invention and showing a contiguous portion of the top of the bottle.

Figure 2 is a plan view of one of the disks of sheet material employed in making the cap.

Figure 3 is a view, similar to Figure 2, of another sheet employed in the manufacture of the cap.

Figure 4 is a fragmentary sectional view taken on a line corresponding to line 4—4, Figure 1.

Figure 5 is a plan view of the sheet as shown in Figure 2 illustrating the arrangement for manufacturing the caps in strip formation.

Figure 6 is a view, similar to Figure 5, illustrating a modified form of the sheet.

Figure 7 is a schematic arrangement of facilities for manufacturing the cap of strip formation, as shown in Figures 5 and 6.

Figure 8 is a fragmentary sectional view, similar to Figure 4, illustrating a modified form of the invention.

The cap illustrated in the drawings consists of a plurality of laminations or disks of sheet material with a layer of the adhesive material arranged between the disks. All of the disks or laminations going to make up the blank or cap are preferably scored in the conventional manner to form overlapping pleats when the skirt of the cap is contracted about the neck of the bottle. One or both of the outside disks, that is the outer laminations forming the inner and outer sides or surfaces of the cap, are perforated or formed with apertures in or adjacent to the pleat formations. These apertures are so formed as to function to prevent the escape of the adhesive material from between the disks during ordinary handling of the cap prior to its application to the bottle and to permit the adhesive substance to exude when pressure is applied to the pleats or overlapping portions of the skirt of the cap during its application to the bottle.

The cap may be formed with two or more layers or laminations. In the embodiment shown in the drawings, the cap is formed with two layers which, in Figures 2, 3 and 4, are in the nature of disks 10, 11. Both of the disks are provided with score lines 12 defining pleat portions 13. The disk 10 is superimposed upon the disk 11 so that the pleat portions 13 of both disks are arranged in register. A layer 14 of adhesive material is interposed between the disks in any suitable manner as by coating the confronting side of one or both of the disks with the adhesive. The dotted formation on disk 11 in Figure 3 illustrates such a coating.

This adhesive may be of a permanently tacky nature, such as certain adhesives employing a latex base, or the adhesive may be in the nature of a low heat, hot melt or wax. In any event, the adhesive can serve the dual function of securing the laminations of the blank together and also securing the overlapping portions as hereinafter described.

As shown in Figures 2 and 5, the top disk 10 is formed with perforations or apertures in the nature of semi-circular incisions 15. These incisions are arranged within the pleat portion 13 or adjacent thereto. The incisions 15 extend through the thickness of the disk 10, being formed by a sharp edge cutting die or the like, whereby the incisions have substantially no width.

With this arrangement, the adhesive 14 will not exude through the incisions 15 during shipment and handling of the cap blanks previous to their application to the bottles. However, when the marginal portion of the cap is folded to form the conventional overlapping pleats, as illustrated in Figure 1, and the pleats are pressed against the neck of the bottle under pressure, the adhesive exudes through the incisions 15, as illustrated in Figure 4, thus adhesively securing the overlapping pleats together. It will, of course, be understood that the adhesive material is of a plastic nature, or is rendered plastic by the application of heat at the time of the exudation. With this arrangement, the cap contracting fingers of the applying machine do not come in contact with the adhesive and accordingly there is no trouble encountered because of the transfer of the adhesive to the contracting fingers causing them to eventually become fouled.

Both of the laminations or disks 10, 11, may be perforated as illustrated in Figures 5 and 6, or both the inner and outer laminations may be perforated in the event the cap is composed of three or more layers.

In Figures 5 to 8, the invention is illustrated in connection with caps made in strip formation. The disks or laminations going to make up the layers of the cap are blanked and scored from separate strips in the manner conventional in making caps in strip formation. In Figure 5, the disks 10 are jointed together forming the strip designated 20, and in Figure 6 the disks 11 form the strip designated 21. In caps of this formation, the disks are polygonal rather than circular, as illustrated in Figures 2 and 3, due to the fact that this form is better adapted for strip formation and, as illustrated in Figure 6, the disks 11 of strip 21 are also perforated, these perforations being in the form of small circular apertures 22. The caps of the strip formation may be advantageously made as illustrated in the schematic arrangement in Figure 7. A strip 25 of paperboard, or other sheet material, is fed from a roll 26 by means of feed rolls 27. This strip is passed in juxtaposition to blanking tools illustrated at 28 where the cap laminations are blanked, scored and perforated, as illustrated in Figure 5.

A second strip 30 is fed from a roll 31, as by feed rolls 32, in juxtaposition to a similar blanking tool 33, whereupon the lower lamination of the caps is formed as illustrated in Figure 6. The formed strip 21 is fed under a conventional adhesive applicator 35, the adhesive being transferred from a fountain 36 by means of rolls 37, 38. The blanks of the strip 20 are superimposed upon the blank of the strip 21, and the two lightly pressed together as by rolls 39, the laminated formation being re-rolled for shipment to the dairy.

Figure 8 is a view similar to Figure 4 illustrating one of the pleat folds in a cap just described. Due to the fact that both the top and bottom layers are perforated, both sides of the pleat is adhesively secured as at 40, 41.

It will be apparent that both the outer and inner disks or laminations of the cap may be formed of paper-board, or one or both of the disks may be formed of any sheet material which is compatible with the adhesive used.

It will also be apparent that the invention is particularly well adapted to the manufacture of blanks and articles from sheet material and does not add appreciably to the cost thereof, and possesses many advantages.

For example, in addition to the fact that the permanently tacky adhesives referred to cause the blanks or articles to stick together, it is also true that such adhesives and also certain hot melts and waxes have a tendency to oxidize or glaze over, thus losing their tackiness when stored over a period of time. Such adhesives also lose their surface tackiness due to the accumulation of a thin filament of dust and again, certain of the hot melt adhesives embody various types of plasticizers which tend to migrate away from the surface of the adhesive which may be due in part to the absorption of the plasticizer by the paperboard.

With my invention, the surface of the adhesive is not exposed to dust or oxidation by the air, but is retained in its original tacky state in the case of the permanently tacky adhesive and in the case of the hot melt or wax adhesive, it is readily exuded by the application of a relatively low degree of heat which removes the danger of scorching or otherwise damaging the blank.

What I claim is:

1. An article formed of sheet material arranged in a plurality of laminations, with portions of the sheet material arranged in overlapping relation, plastic adhesive material interposed between said laminations, at least one of said laminations, forming one of the confronting surfaces of said overlapped portions, being formed with an incision operable to prevent the escape of said plastic adhesive material from between said laminations during handling of the sheet material, and to permit said plastic adhesive material to exude upon said overlapping portions upon the application of pressure thereto.

2. A hood type bottle cap having a skirt portion adapted to be contracted about the neck of the bottle comprising inner and outer layers of sheet material, the marginal portion of the cap being scored to define overlapping pleat portions when the skirt portion of the cap is contracted about the neck of the bottle, plastic adhesive material interposed between said layers, and said layers being formed with incisions operable to prevent the escape of the plastic adhesive material from between the layers during ordinary handling of the cap, and to permit the plastic adhesive material to exude upon said pleat portions upon contraction of the cap skirt portion under pressure.

3. A hood type bottle cap having a skirt portion adapted to be contracted about the neck of the bottle comprising inner and outer layers of sheet material, the marginal portion of the cap being scored to define overlapping pleat portions when the skirt portion of the cap is contracted about the neck of the bottle, plastic adhesive material interposed between said layers, and one of said layers being formed with incisions in said pleat portions operable to prevent the escape of the plastic adhesive material from between the layers during ordinary handling of the cap, and to permit the plastic adhesive material to exude upon said pleat portions upon contraction of the cap skirt portion under pressure.

4. A sheet of flexible material formed of a plurality of laminations, plastic adhesive material interposed between said laminations and serving to secure the same together to form said sheet material, one of said laminations, forming one surface of the sheet material, being formed with incisions of restricted width and operable to retain and prevent the escape of said plastic adhesive material from between said laminations, and to permit said plastic adhesive material to exude upon the application of pressure on said sheet material.

5. A bottle cap of the hood type having a skirt portion adapted to be contracted about the neck of the bottle comprising a plurality of disks of sheet material laminated with plastic adhesive material, said disks being processed to form overlapping pleat formations when the skirt portion of the cap is contracted about the neck of the bottle, one of said disks, forming one surface of the cap, being formed with apertures or incisions of restricted dimension arranged in said pleat formations and being operable to retain the plastic adhesive material between said disks during normal handling of the cap, and to permit the plastic adhesive material to exude through such incisions upon contraction of the cap skirt portion under pressure against the bottle neck.

ISAAC L. WILCOX.